US 6,566,769 B1

(12) United States Patent
Layton

(10) Patent No.: US 6,566,769 B1
(45) Date of Patent: May 20, 2003

(54) THREE PHASE FLAT CABLE INDUCTANCE BALANCER

(75) Inventor: James Edward Layton, Chelsea, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/559,787

(22) Filed: Apr. 27, 2000

Related U.S. Application Data

(60) Provisional application No. 60/131,323, filed on Apr. 27, 1999.

(51) Int. Cl.[7] .................................................. H02J 3/26
(52) U.S. Cl. ......................... 307/147; 307/148; 307/87
(58) Field of Search .............................. 307/147, 148, 307/14, 13, 87; 174/117 F, 117 FF

(56) References Cited

U.S. PATENT DOCUMENTS

| 1,376,417 A | * | 5/1921 | Fortescue | 307/14 |
|---|---|---|---|---|
| 1,505,822 A | * | 8/1924 | Treanor | 307/14 |
| 1,524,226 A | * | 1/1925 | Atkinson | 307/14 |
| 2,808,519 A | * | 10/1957 | Rau | 307/14 |
| 3,855,412 A | * | 12/1974 | Maddux | 13/6 |
| 4,328,523 A | * | 5/1982 | Seguin | 361/56 |
| 4,330,740 A | * | 5/1982 | Shell et al. | 318/780 |
| 4,352,026 A | * | 9/1982 | Owen | 307/14 |
| 4,419,711 A | * | 12/1983 | Seguin | 361/111 |
| 4,574,231 A | * | 3/1986 | Owen | 307/14 |
| 4,868,481 A | * | 9/1989 | Owen | 307/14 |
| 4,893,069 A | * | 1/1990 | Harada et al. | 307/14 |
| 5,408,165 A | * | 4/1995 | Voet | 318/523 |
| 5,471,127 A | | 11/1995 | Vaughan et al. | 318/809 |
| 5,565,753 A | | 10/1996 | Chen et al. | 318/809 |
| 5,672,957 A | | 9/1997 | Bergmann | 323/210 |
| 5,821,726 A | | 10/1998 | Anderson | 318/809 |
| 5,949,170 A | * | 9/1999 | Davis | 310/208 |
| 5,990,654 A | * | 11/1999 | Skibinski et al. | 307/105 |
| 6,043,569 A | * | 3/2000 | Ferguson | 307/105 |
| 6,081,080 A | * | 6/2000 | Davis | 318/71 |

OTHER PUBLICATIONS

Derwent abstract of CA 2307253, Oct. 27, 2000.*
Derwent abstract for RD421008A, May 10, 1999.*

* cited by examiner

Primary Examiner—Fritz Fleming

(57) ABSTRACT

An inductance balancer is connected between a drive and a flat three phase power transmission cable employed to carry power to a remote load. The inductance balancer includes a first inductance device (e.g., a single wound inductor) connecting the center cable conductor to the drive and raising the total effective inductance of the center cable conductor to the inductance of either of the outer cable conductors at maximum inductance. The inductance balancer also includes a second inductance device connecting both outer conductors to the drive and adding an inductance equal to that of the first inductance device when current exists only on an outer conductor and the center conductor, but adding no inductance to the outer conductors when current exists only on those two conductors. The second inductance device may be a dual wound inductor with each series connected to an outer conductor so that current carried or returned by one outer conductor travels through the inductor in an opposite direction to current carried or returned by the opposite outer conductor. The inductances resulting from equal currents on the outer conductors will therefore cancel, but the inductance resulting from currents in only one outer conductor and the center conductor will not. The result is a degree of equalization of total inductance on all conductors for all current phasings, removing the flat cable characteristics from the system.

16 Claims, 13 Drawing Sheets

THREE PHASE FLAT CABLE INDUCTANCE BALANCER

This application claims the benefit of provisional application No. 60/131,323, filed Apr. 27, 1999.

BACKGROUND OF THE INVENTION

1. Field of the Invention

The present invention relates generally to three phase power transmission, and more specifically to an inductance balancer for three phase power transmission over a flat cable.

2. Description of the Prior Art

Three phase power transmission generally employs separate conductors for each phase. The conductors within a three phase cable are generally in relatively close proximity, giving rise to inductive effects between each current carrying conductor and the remaining conductors. The instantaneous current in each of the three conductors varies with the current phase: at one instant, current is carried on one conductor and returned on a second while current within the third conductor is zero; at other times during the cycle, current is carried on one conductor and returned in equal parts on the other two conductors. The current changes result in corresponding changes in inductance between the conductors.

For this reason, round cables, in which each conductor as seen from a cross-section is spaced an equal distance from the other two at the apex of an equilateral triangle, are generally preferred for three phase power transmission. Some apparently believe that, due to geometry, total inductance remains unchanged as current varies between the two instantaneous values described above (i.e., zero current in one phase with current carried and returned in the remaining two phases versus current carried in one phase and returned equally on the remaining two phases). In fact, total inductance varies significantly with the current phase. However, as current changes throughout a phase cycle, the total cable inductance moves through a repetitive cycle. Since the cable is round and symmetric, each conductor goes through identical cycles. The total inductance of the cable moves through 6 peaks and valleys as the current goes through one complete line frequency cycle so that each phase, while not constant in inductance, presents the same inductance cycle between source and load and therefore the root-mean-square (RMS) currents remain balanced.

Flat three phase cables, in which the conductors as seen from a cross-section all lie within a common plane, are known to imbalance RMS currents. Flat cable causes current imbalance primarily due to differing inductance characteristics for the three conductors in the cable. Some degree of resistive imbalance may exist due to the slightly higher temperature of the center conductor, but this effect is completely overshadowed by the inductive behavior. Upon analyzing a three phase system with an inductive load which is driven through three inductors including one with lower inductance than the other two, current on the phase with the smaller inductance will be found to be highest, with the lowest current found on the leading phase (with respect to the phase having the smallest inductance) and current on the lagging phase falling somewhere in between. Similar analysis with resistors in place of inductors, with the resistance on one phase being greater than on the other two, shows that the high resistance phase will have the middle level current, with the lagging phase having the highest current and the leading phase again having the lowest current. The magnitude of these effects determined by analysis and measurement of flat cable current shows that the inductance is the unbalancing factor when flat cable is utilized for three phase power transmission.

When flat cable is utilized to drive a three phase motor, the differing conductor inductances cause small changes in the voltage amplitude and phase at the motor terminals. The small differences in voltages are known to cause relatively large differences in phase currents, with those unbalances causing additional voltage drops and worsening the unbalance until an equilibrium is reached. Use of long lengths (5,000 to 8,000 feet) of flat cable to drive a three phase motor may thus result in current unbalance on the order of 10 to 15 percent. Additionally, in most applications, drives are sized closely to the required power (kilo-volt ampere or KVA)—that is, the drive output current capability is sized close to the current needed by the motor. Even if the drive can produce more current, exceeding the motor nameplate current is usually avoided by setting the current limit of the drive. In either case, when flat cable it utilized, one phase will reach the current limit before the other two, at which time the drive will cease to increase in frequency and the pump will operated at a lower RPM than desired. Accordingly, conductor inductance differences may result in significant voltage and current unbalances at the motor terminals and limit drive frequency.

In many applications, such as downhole motor applications where casing and tubing dimensions do not leave enough room for round cable, use of flat cable is imperative. In addition to dimensional considerations, logistics or splicing concerns may drive the use of flat cable. Many reasons, each having validity, may prompt the use of flat cable for three phase power transmission rather than round cable, and thus current imbalances are frequently encountered.

Several means of current balancing have been used or attempted, the simplest of which is transposition of conductors such that each phase is on the center conductor for equal cable lengths. This technique is often utilized for surface power lines and is also applicable to ESP applications. However, transposition splices often become large, and in some cases no room for the splice exists while in other cases the transpositions splices are a source of installation difficulty or the source of concern associated with having any additional splices.

It would be desirable, therefore, to provide a mechanism for balancing current in flat cables employed for three phase power transmission. It would also be advantageous for the mechanism to balance inductance.

SUMMARY OF THE INVENTION

An inductance balancer is connected between a power source and a flat three phase power transmission cable employed to carry power to a remote load. The inductance balancer includes a first inductance device (e.g., a single wound inductor) connecting the center cable conductor to the drive and raising the total effective inductance of the center cable conductor to the inductance of either of the outer cable conductors at maximum inductance. The inductance balancer also includes a second inductance device connecting both outer conductors to the drive and adding an inductance equal to that of the first inductance device when current exists only on an outer conductor and the center conductor, but adding no inductance to the outer conductors when current exists only on those two conductors. The second inductance device may be a dual wound inductor with each series connected to an outer conductor so that current carried or returned by one outer conductor travels through the inductor in an opposite direction to current carried or returned by the opposite outer conductor. The inductances resulting from equal currents on the outer conductors is zero because of the magnetic fields cancel, but the inductance resulting from currents in only one outer conductor and the center conductor is full value. The result is a degree of equalization of total inductance on all conductors for all current phasings, removing the flat cable characteristics from the system.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
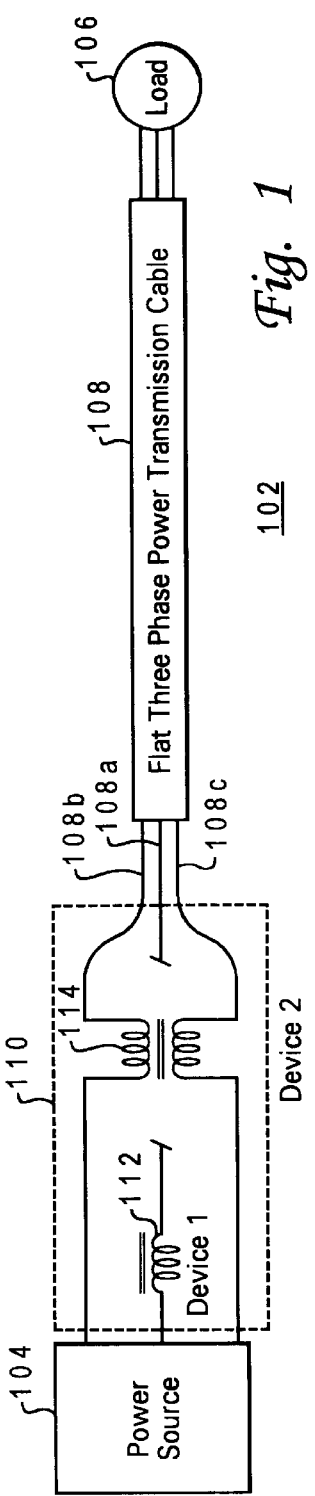
FIG. 1 depicts a diagram of a system for three phase power transmission over a flat cable in accordance with a preferred embodiment of the present invention.

With reference now to the figures, and in particular with reference to FIG. 1, a diagram of a system for three phase power transmission over a flat cable in accordance with a preferred embodiment of the present invention is depicted. System 102 includes a three phase source 104 of the type known in the art employed to drive a load 106, which may be, for example, a motor. Load 106 may be mounted within a downhole tool. Drive 104 is electrically connected to load 106 by flat three phase cable 108, which includes three substantially parallel conductors 108a–108c lying within a common plane and may be run through casing or tubing in the manner known in the art. Inductance balancer 110 is connected between drive 104 and flat cable 108.

Inductance balancer 110 includes a first inductance device 112 connected between source 104 and flat cable 108 on the center conductor or phase 108a, raising the total effective inductance of the center conductor 108a to the inductance of either of the outer conductor 108b or 108c at maximum inductance. Inductance device 112 in the exemplary embodiment is a single wound inductor of appropriate size. Inductance balancer 110 also includes a second inductance device 114 connected between drive 104 and flat cable 108, coupled to both outer conductors 108b and 108c. Inductance device 114 adds an inductance equal to that of inductance device 112 to either outer conductor 108b or 108c when current exists only on that outer conductor 108b or 108c and on center conductor 108a, but adds no inductance to the outer conductors 108b and 108c when current exists only on those two conductors (i.e., no current exists on center conductor 108a). In the exemplary embodiment, inductance device 114 is a dual wound inductor with each series connected to an outer conductor 108b or 108c. The windings are so connected as to add no inductance when current exists only on the outer conductors 108b and 108c, and adds inductance equal to that of inductance device 112 when current exists only on an outer conductor 108b or 108c and the center conductor 108a. Each winding of the dual wound inductor is accordingly sized to have an inductance value equal to the inductance of device 112.

In the exemplary embodiment, if the windings of the dual inductor are wound around the common core in the same direction, each series is connected to an outer conductor 108b or 108c so that current from one outer conductor 108b travels through the device 114 in a direction opposite that of current from the other outer conductor 108c. The inductances from both currents on outer conductors 108b and 108c thus cancel each other. When no current exists on one outer conductor 108b, no inductance is created to cancel the inductance resulting from current on the other outer conductor 108c, and the full value of a single inductor winding is added to that outer conductor 108c. The result is to equalize total inductance on all conductors for all current phasings, removing the flat cable characteristics from the system.

Referring to FIGS. 2A through 2J, magnetic field intensity contour plots for various geometries and line frequency phases are illustrated. In computing inductance between multiple conductors for a system, it is convenient to forego attempts to write closed form expressions for inductance and instead to simply generate magnetic field intensity in an array and then integrate over all space (the whole array) and divide by the square of the current magnitude. With available computers and programs this task is manageable, and is utilized to generate the plots described below.

The most familiar circumstance for cable inductance analysis, and the most common analysis performed, is for the single phase current circumstance (which is not necessarily limited to single conductors). Cable inductance is generally thought of as a fixed characteristic of the cable, depending upon the geometry of the cable. This is true for single phase current cables since all current going into one or more conductors must always return on the other conductors. Magnetic field intensity increases as the current increases, but the conductor positions relative to each other never change and therefore inductance never changes. Note, however, the total inductance of a cable increases as the conductors are moved further apart.

Figure 2A:
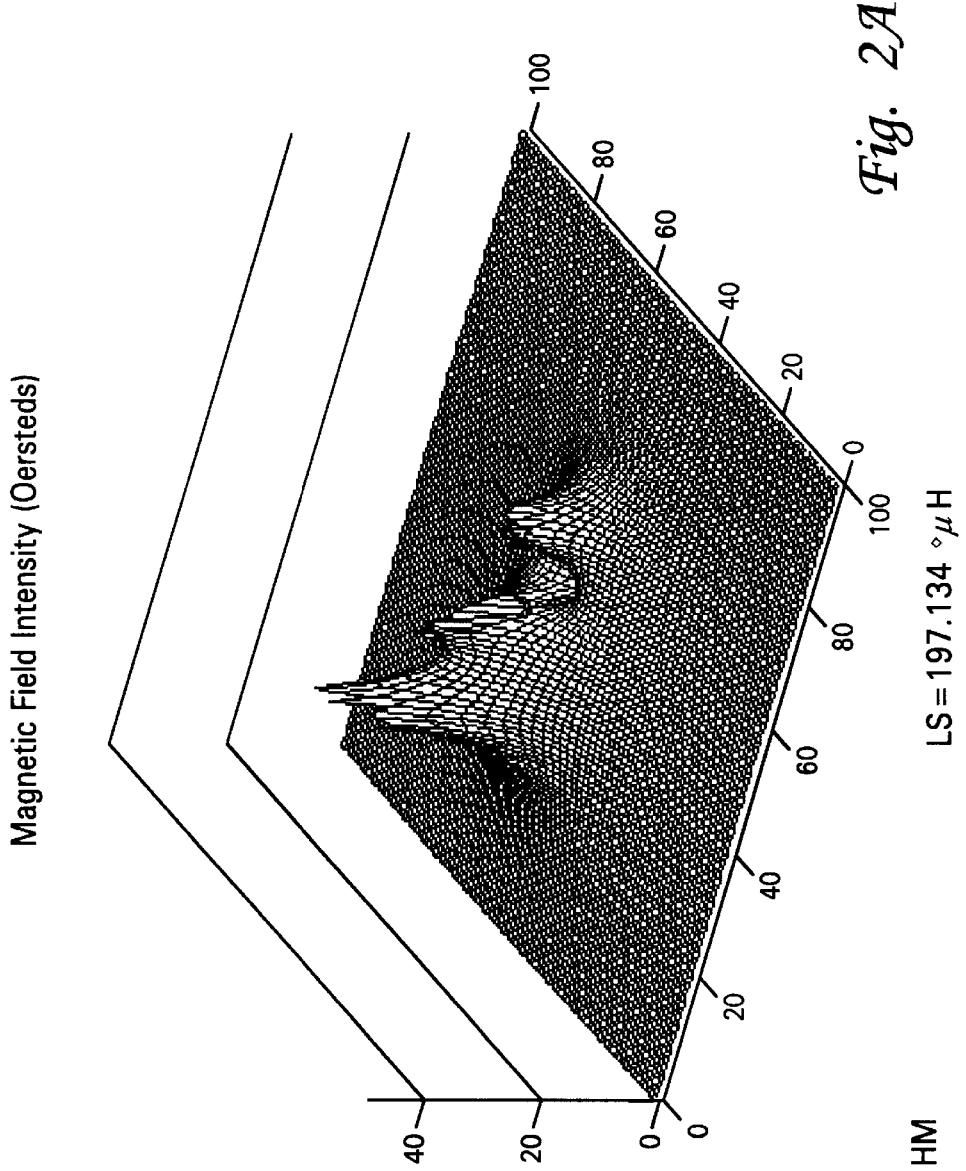
FIGS. 2A–2J are magnetic field intensity contour plots for various geometries and line frequency phases.
Figure 2B:
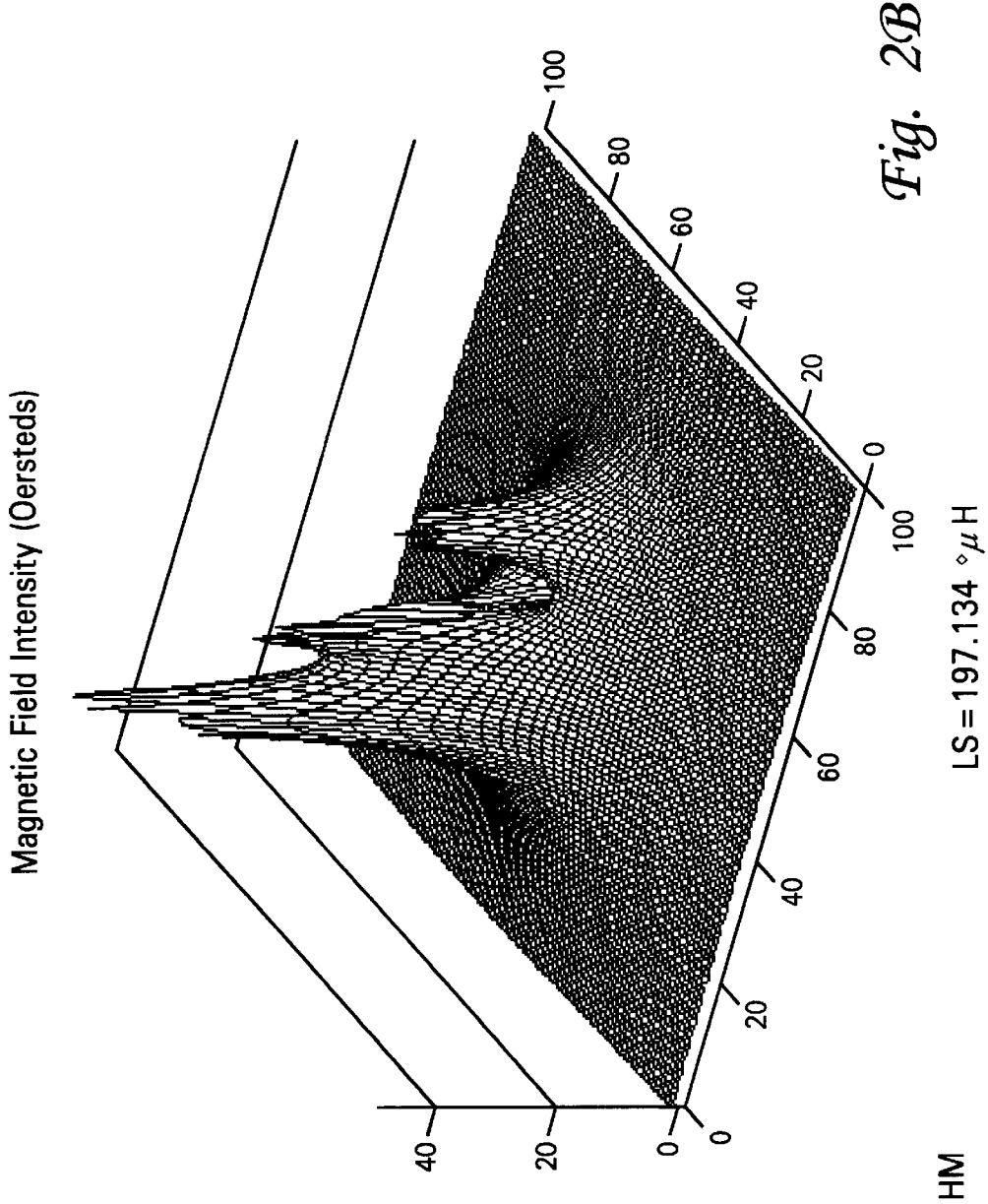

FIG. 2A illustrates magnetic field intensity magnitude at a cross-section for a piece of flat cable in which a single phase current is flowing in the leftmost conductor and returning equally in the two rightmost conductors. The total cable inductance of 1,000 feet of cable is shown as LS=197.134 $\mu$H. FIG. 2B is the same cable driven in the same manner but at a higher current level. The computed total cable inductance has not changed although field strength has increased since inductance is a ratio of total magnetic flux over current. Only changes to conductor size or position will alter the inductance per unit length of cable.

Figure 2C:
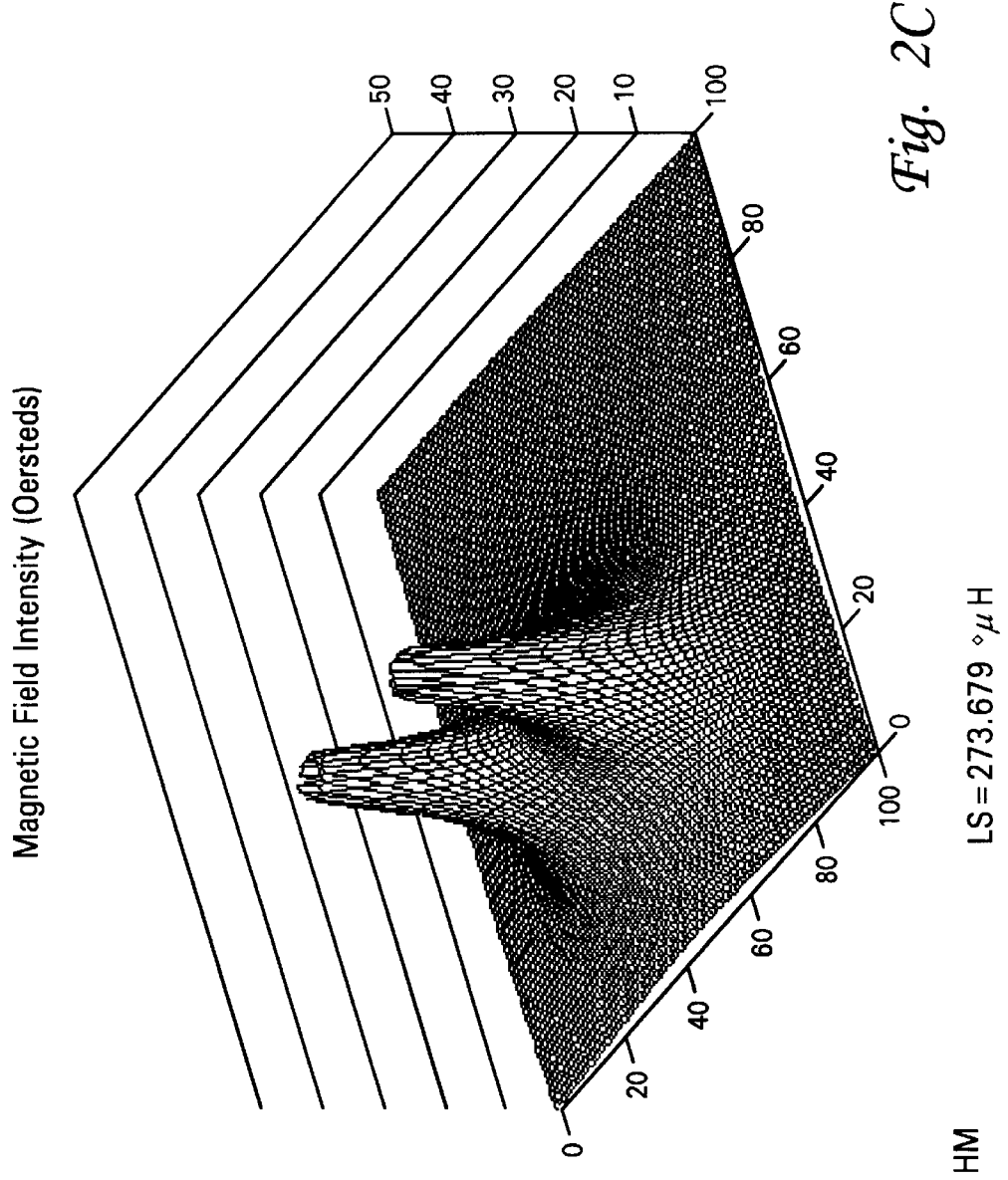

Three phase currents require careful thought about the causes of inductances and, in particular, about the effect of the relative positions of current carrying conductors on the total effective inductance. Examination of the behavior of three phase current in round cables is instructive in understanding the behavior of three phase current in flat cables. When considering instantaneous current values on all three conductors, two circumstances provide the extremes of inductance which a round cable presents to the electrical system. At least once during the line frequency cycle, the current on one conductor will be zero while current is present on the remaining two conductors, which may be treated as equivalent to the two conductor, single phase circumstance of FIGS. 2A and 2B. FIG. 2C illustrates the magnetic field strength for the instant during which all current exists on only two conductors. Total inductance of the cable is easily computed at these two instants from the well known inductance expression for two conductor cable:

$$L = \frac{\mu_o \cdot l}{\pi} \ln\left(\frac{D}{a}\right)$$

$$a = \frac{e^{-0.25}}{2} \cdot d$$

where L is the cable inductance, $\mu_0$ is the permeability of space, D is the conductor separation, a is the conductor geometric mean radius, and d is the conductor diameter.

Figure 2D:
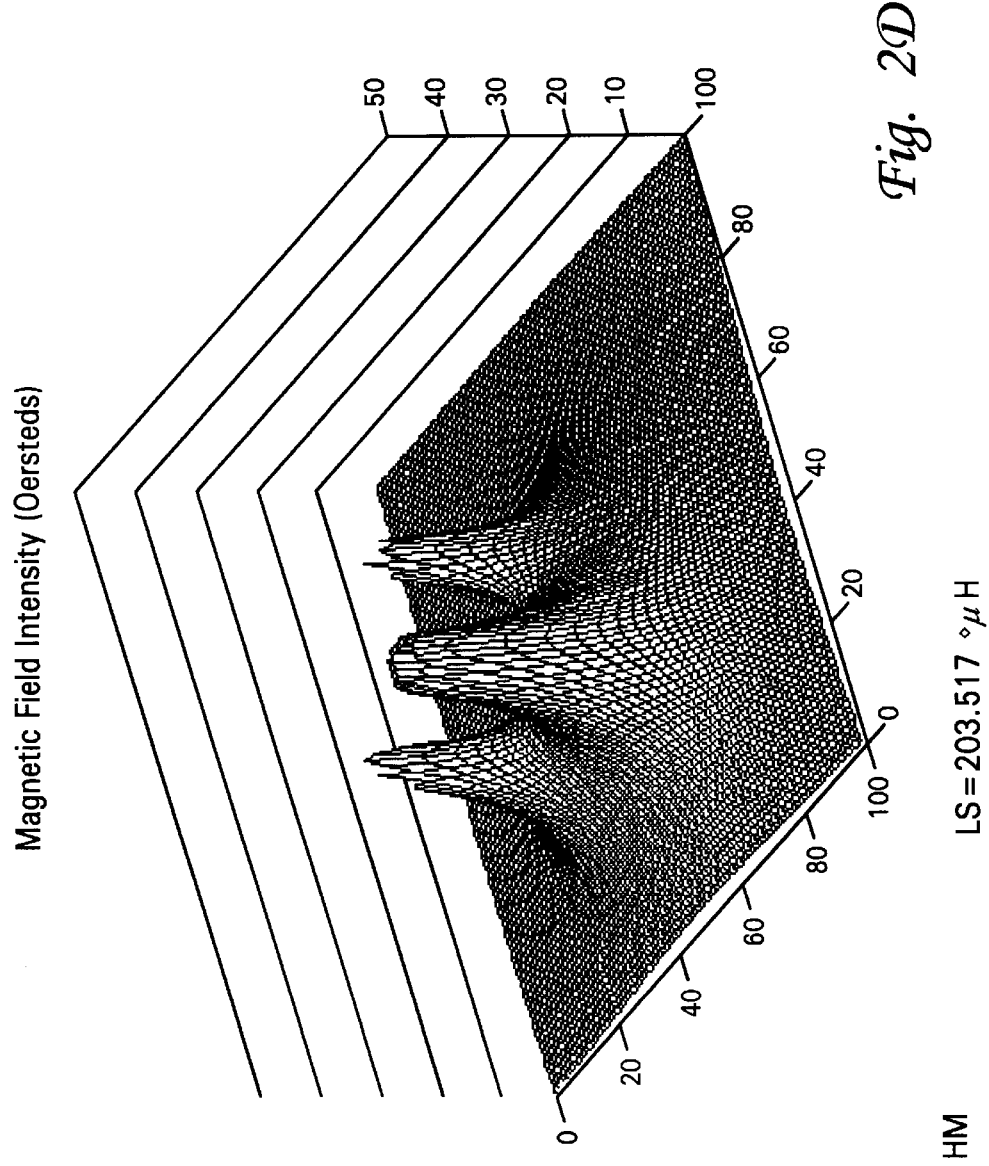
Figure 2E:
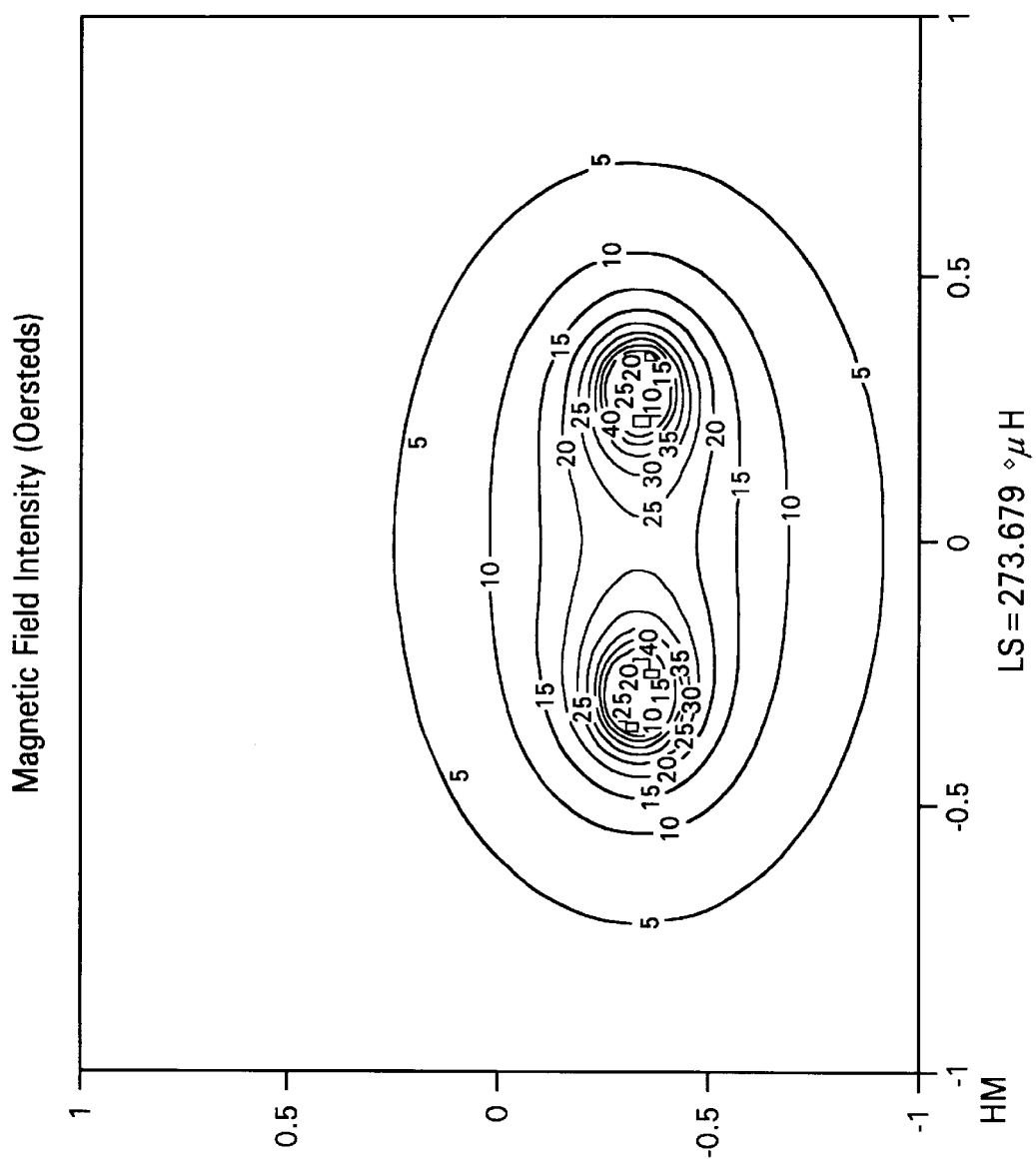
Figure 2F:
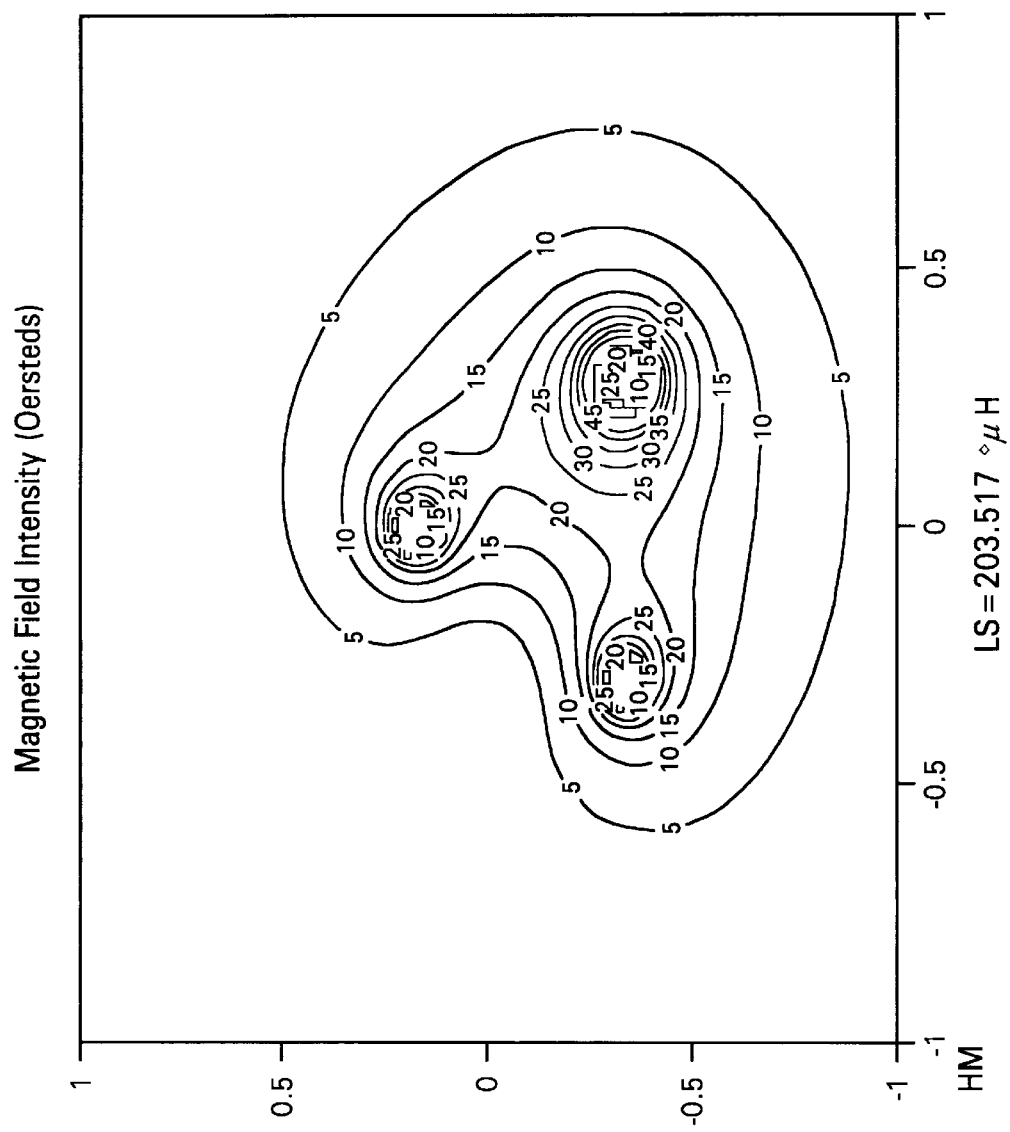

At least once during a three phase current line frequency cycle, the current enters one conductor and returns on the other two, with each return conductor carrying half of the total. The magnetic field strength for this circumstance is shown in FIG. 2D. It cannot be accurately concluded that, since each return conductor has half of the total current and they are equidistant from the first conductor, there will be no change in inductance. As found by the field integration approach, the actual total inductance is lower than for the two conductor circumstance of FIG. 2C, dropping to about 75% of the total inductance for the two conductor instant. The magnetic field produced about the whole cable remains essentially constant in magnitude and volume, but rotates around the cable making one revolution per line frequency cycle. This magnetic field is produced in the two conductor circumstance of FIG. 2C by 86.6% of the current which occurs in the three conductor circumstance of FIG. 2D. Since the same total field is produced by less current the inductance has increased. This is shown in FIGS. 2E and 2F, which are contour plots looking into the end of a cable cross-section for the two conductor and three conductor circumstances of FIGS. 2C and 2D, respectively. As the current changes throughout a cycle, the total cable inductance moves through a repetitive cycle which, since the cable is round and symmetric, is identical for each conductor. The total circuit inductance moves through 6 peaks and valleys as the current goes through one complete line frequency cycle. Each phase, while not constant in inductance, presents the same inductance cycle between load and source, such that RMS current remain balanced.

Figure 2G:
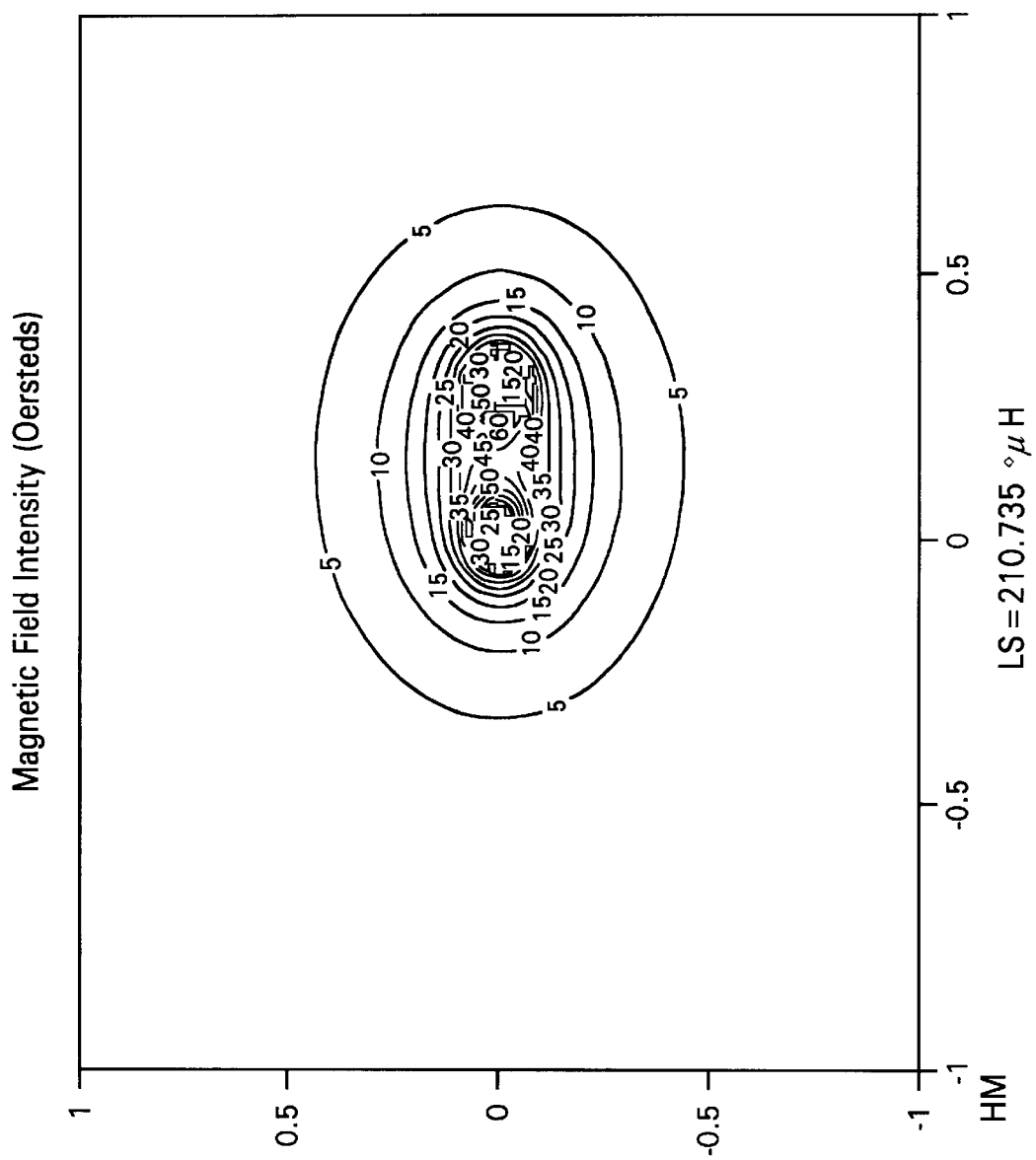
Figure 2H:
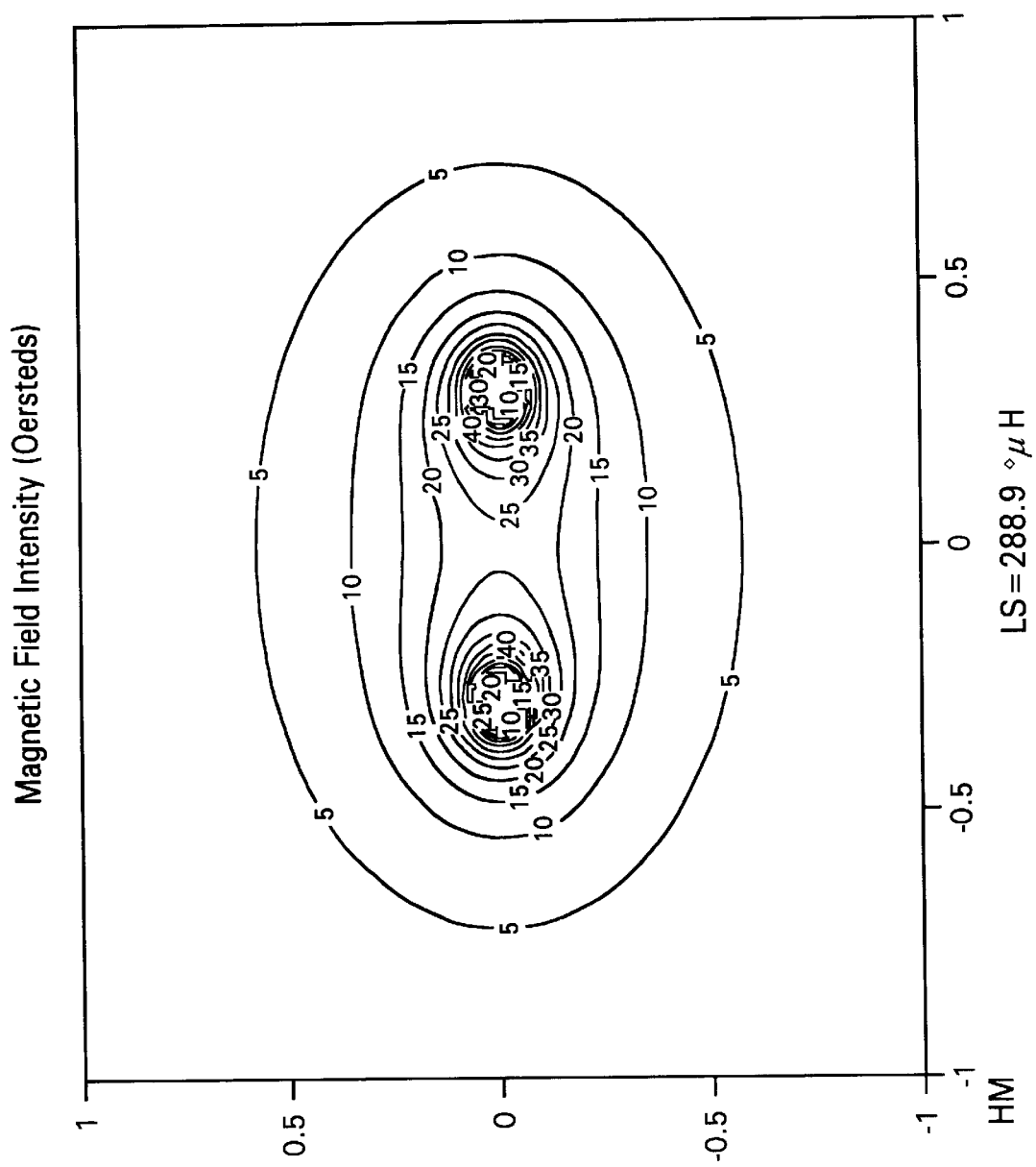

The conductors of a flat cable carrying three phase current also move through an inductance cycle, but one which differs between the outer conductor and the center conductor due to the geometry. At one instant during each line frequency cycle, current enters an outer conductor and returns through the center conductor (that is, current in the opposite outer conductor is zero) as illustrated in FIG. 2G. The total inductance at that instant may be easily calculated. At another instant, however, current within the center conductor is zero, with current entering one outer conductor and returning on the other as illustrated in FIG. 2H. The distance between current-carrying conductors has doubled (assuming the conductors are equally spaced) and inductance has therefore increased.

Figure 2I:
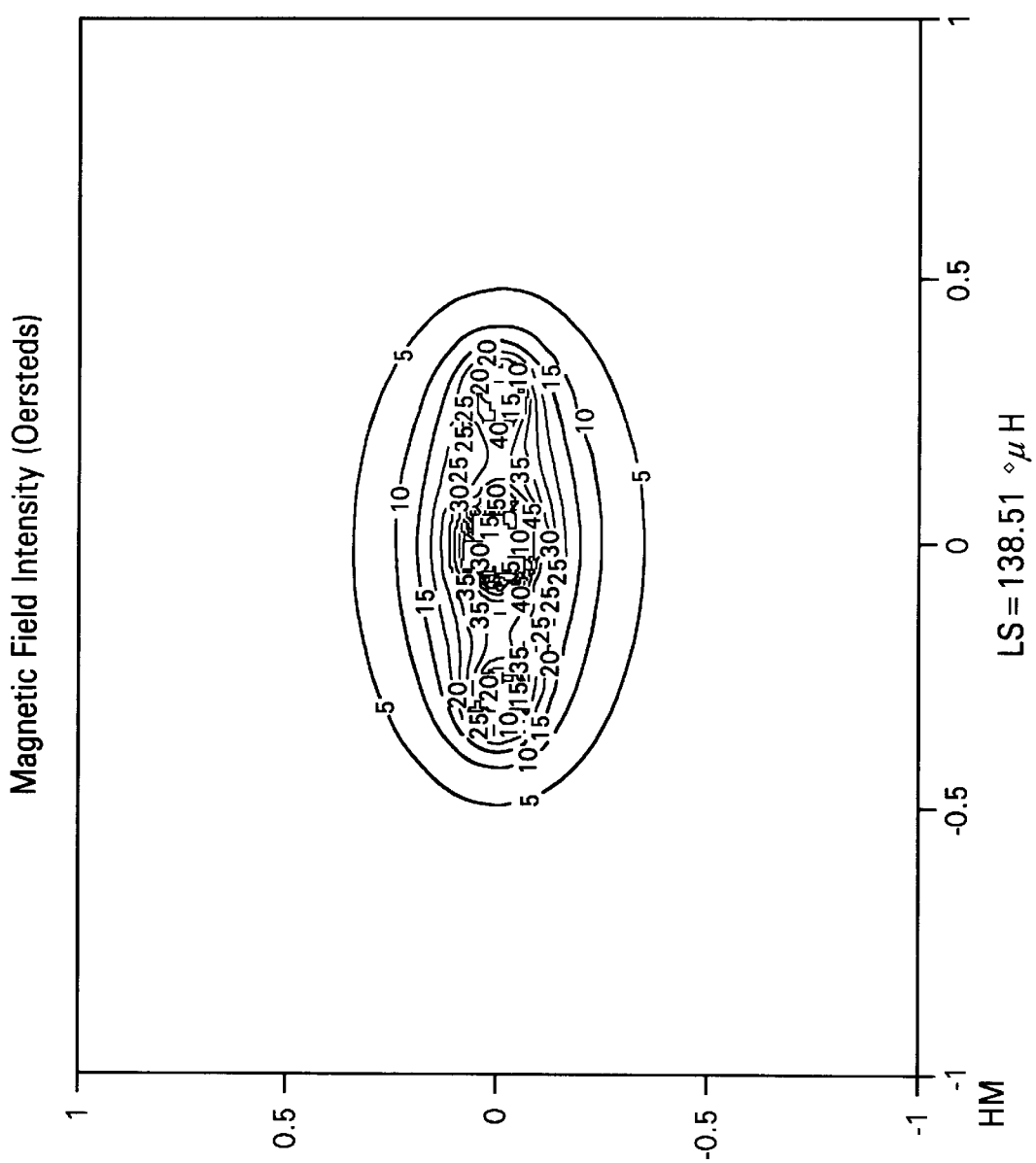

The magnetic field plot for the instant at which current enters the center conductor and returns through only one outer conductor (current in the opposite outer conductor is zero) is essentially the same as FIG. 2G. At the instant when current enters the center conductor and returns equally on both outer conductors as illustrated in FIG. 2I, however, the change seen by the outer conductors is much larger than that seen by the center conductor. Similarly, the magnetic field in FIG. 2G (in which current enters an outer conductor and returns only in the center conductor) differs significantly from the magnetic field plot for the instant at which current enters and outer conductor and returns equally in both the center and opposite outer conductors, shown in FIG. 2J.

Figure 2J:
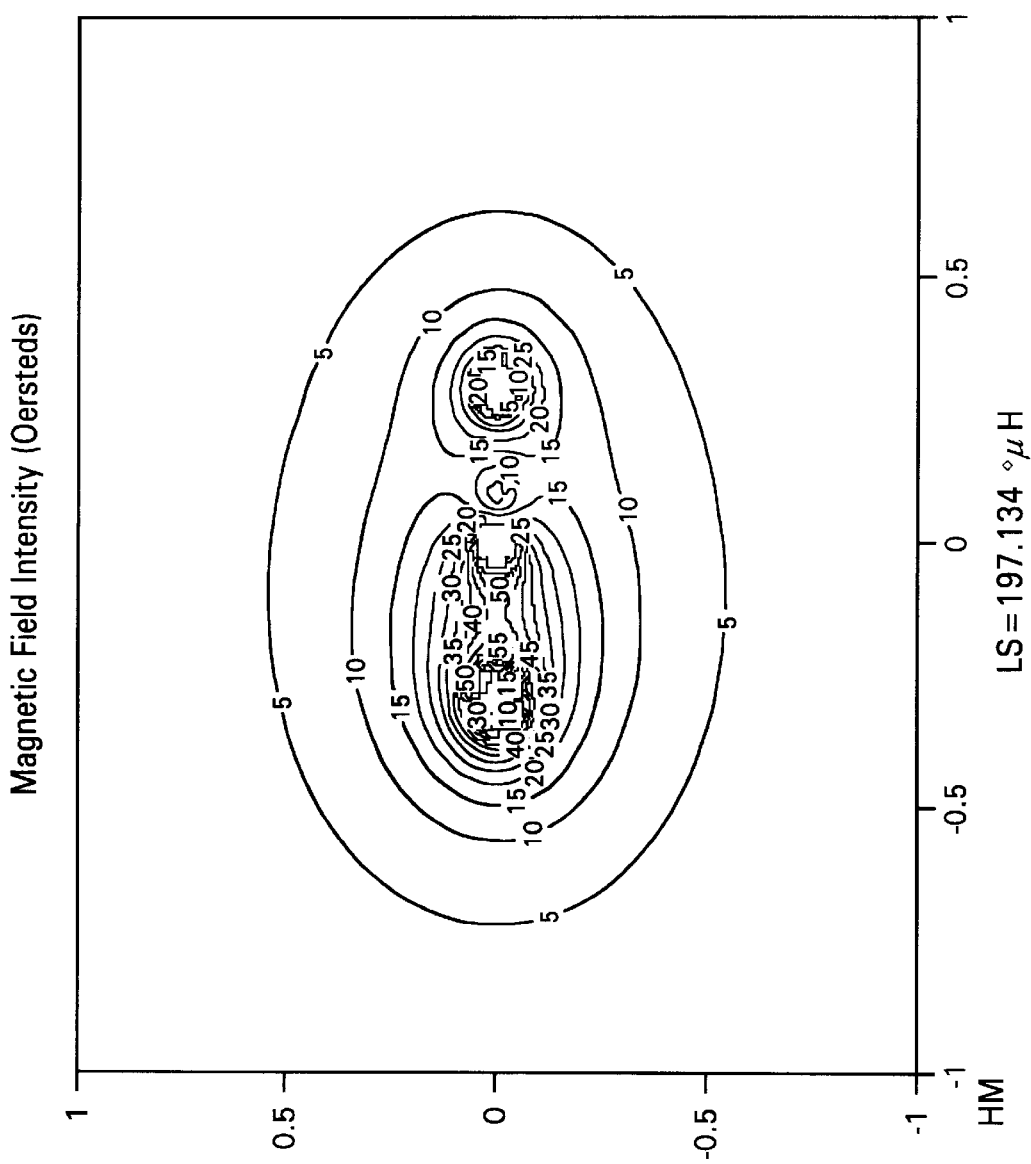

As with the round cable, flat cable total inductance cycles through six peaks and valleys. However, the magnitudes vary, resulting in 4 unique levels ranging from much less than the minimum of equally sized round cable to much higher than the round cable maximum. FIG. 2G corresponds to inductance at a lower level peak, while FIG. 2H represents the conditions when total inductance is at the maximum peak. Similarly, FIG. 2I is the minimum value for total inductance, while FIG. 2J is a lower level valley.

Figure 3A:
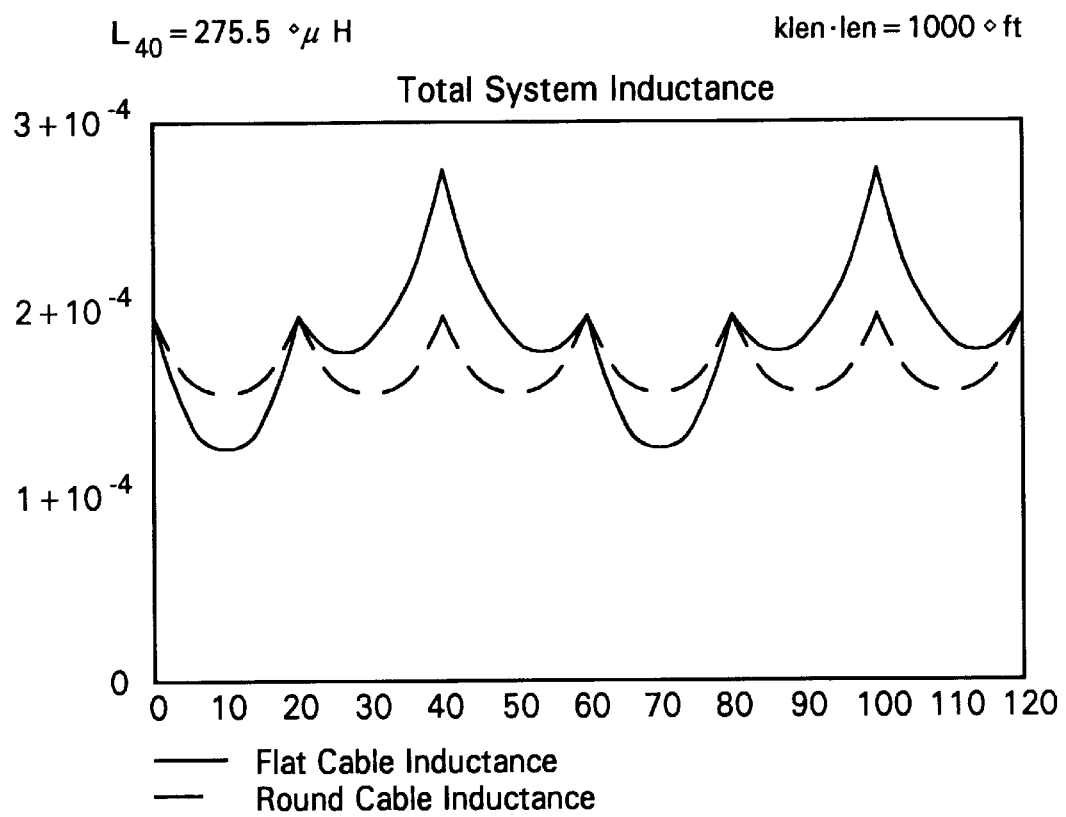
FIGS. 3A–3B depict comparative total cable inductance plots for one line frequency current cycle of three phase current transmission in round and flat cables with and without an inductance balancer in accordance with a preferred embodiment of the present invention.
Figure 3B:
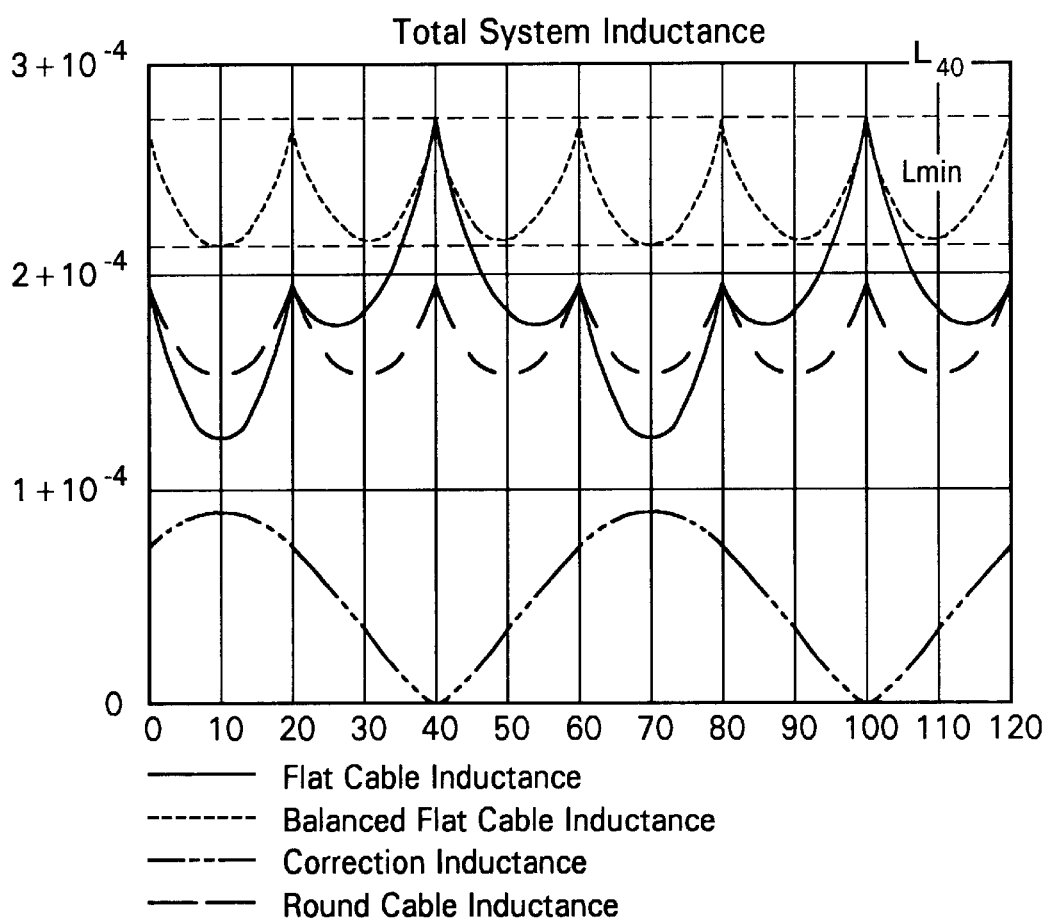

With reference to FIGS. 3A and 3B, comparative total cable inductance plots for one line frequency current cycle of three phase current transmission in round and flat cables with and without an inductance balancer in accordance with a preferred embodiment of the present invention are depicted. FIG. 3A is total cable inductance for round (dashed line) and flat (solid line) cables without the inductance balancer, spanning one cycle of the current (120 steps at 3° per step). The six peaks and valleys for both cables and the 4 unique values for flat cable may be readily seen.

Inductance may be added to the center conductor only to attempt current balancing. Only minimal results may be achieved in this manner as may be seen from the cyclic nature of the flat cable inductance apparent from FIG. 3A. As the added center inductance is increased, the unbalance will decrease at first, but then another phase will begin to increase in RMS current. With enough tuning, two phases could conceivably be made equal but the third phase will be different.

With the inductance balancer of the present invention, shown and described above in connection with FIG. 1, inductance is added to the phases in a manner countering the inductance cycle variations caused by the flat cable geometry. FIG. 3B illustrates total cable inductance for flat cable with the inductance balancer spanning one current cycle. Correction inductance is added to the flat cable inductance in a unique fashion whereby the appropriate inductance is added to the correct phase at the right time. The result causes the inductance balancer inductance plus flat cable inductance to resemble the round cable inductance, but with higher peak and valley inductance values. These higher values cannot be avoided since the peak inductance of the flat cable cannot be reduced. The inductance balancer simply increases the lower inductance peaks to equal the largest inductance peaks, corresponding to current entering and returning only on the outer conductors. The added inductance also raises the minimum inductance values. A reciprocal of the inductance change due to the flat cable geometry is thus inserted into the circuit to create a total inductance similar to that of a round cable.

Since field situations require balancing over a wide range of cable lengths, the inductor balancer of the present invention may be equipped with course and fine step adjustments in the inductance values for the first and second inductance devices, to zero in on a particular cable length. In downhole applications, additional variances are introduced in each application by the tubing and casing, with cable inductance increasing as a result of the cable be strapped to the tubing and placed within the casing. When the cable is against the casing wall, the inductance will be further increased. As a result, the inductor balancer preferably provides fine tuning controls for safe adjustment while the pump or other equipment is online.

Figure 4:
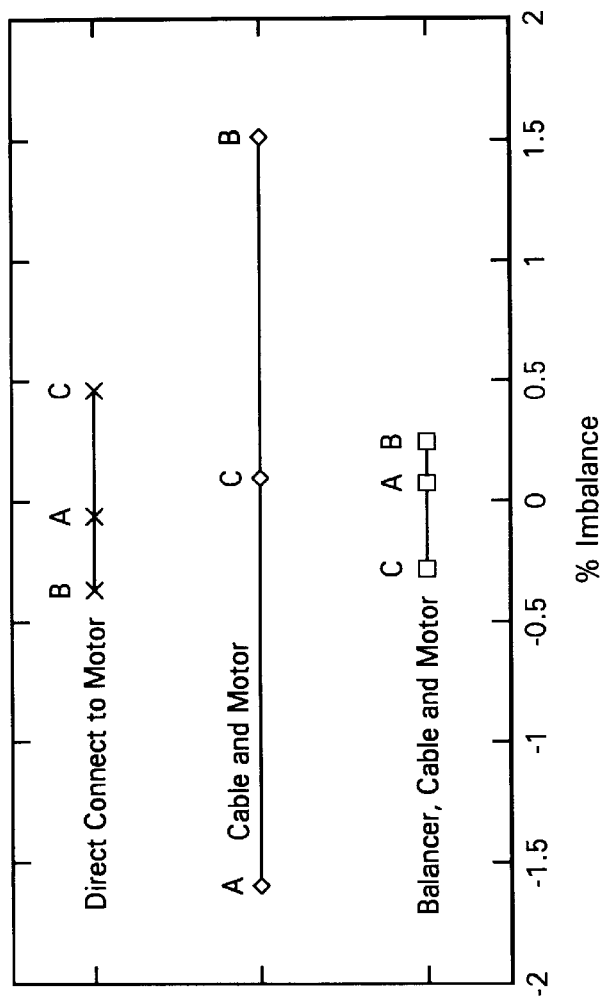
FIG. 4 is a comparative current balancing plot showing current balancing with and without an inductance balancer in accordance with the present invention.

Referring to FIG. 4, a comparative current balancing plot showing current balancing with and without an inductance balancer in accordance with the present invention is shown. A drive for powering a 50 Hp motor coupled to a generator loaded with a 50 Hp resistive load was employed to measure current imbalance, generator frequency, and motor slip. The drive was coupled directly to the motor, coupled through approximately 3,000 feet of flat cable, and coupled through an inductance balancer and 3,000 feet of flat cable. As may be seen, the inductance balancer of the present invention balanced currents to a point even closer than with direct connection between the drive and motor. The motor showed almost 0.5% imbalance in the direct connection (top line), which jumped above 1.5% when the flat cable was added (middle line), but fell to about 0.4% when the inductance balancer was added to the flat cable (bottom line). Additionally, tests run at both 50 and 60 Hz demonstrated that the inductance balancer is frequency independent. With a drive operating in current limit, and thus at a frequency lower than requested, the inductance balancing of the currents increased the output frequency. At fixed frequency measured output frequency of the driven generator revealed only a slight improvement in slip, increasing RPM and generator frequency by less than about 0.1 Hz at 50 Hz.

Balancing currents as achieved by the present invention may be quite important when the unbalance becomes relatively large. When currents are severely unbalanced, motor vibration and losses increase, and motor life is reduced. Of more direct concern are applications where the achievable frequency, and hence the motor RPM, is limited due to high current on one phase, resulting in lower production. In downhole applications, as pump depth increases, these difficulties worsen due to increased downhole temperature and increased unbalance resulting from greater flat cable length.

The present invention may be applied to virtually any situation by placement of the inductance balancer between the present system output and the cable. The inductance balancer course setting may be determined by the total maximum cable inductance, which may be calculated from conductor separation, wire size, and cable length. The system may then be started and final balancing adjustments performed while the system is running. The inductance balancer of the present invention does not increase the peak inductance presented by the cable, but instead brings all peaks up to the same level. Since the actual cable reactance is a small percentage of the cable voltage drop, typically less than 5%, the balancing technique does not require a significant increase in the source power.

While the invention has been particularly shown and described with reference to a preferred embodiment, it will be understood by those skilled in the art that various changes in form and detail may be made therein without departing from the spirit and scope of the invention.

What is claimed is:

1. A three phase flat cable inductance assembly, comprising:
   first and second connections for connecting the inductance assembly to outer conductors of a flat, three phase power cable including two outer conductors and a center conductor; and
   an inductance device coupled to both outer conductors of the cable through the first and second connections, the inductance device having
   a minimum inductance when current is carried only on the outer conductors during transmission of three phase power over the cable, and
   a maximum inductance when current is carried only on the center conductor and one outer conductor during transmission of three phase power over the cable.

2. The three phase flat cable inductance assembly of claim 1, wherein the maximum inductance of the inductance device is approximately equal to a difference between an inductance of the cable when current is carried only on the outer conductors during transmission of three phase power over the cable and an inductance of the cable when current is carried only on the center conductor and one outer conductor during transmission of three phase power over the cable.

3. The three phase flat cable assembly of claim 1, further comprising:
   a third connection for connecting the inductance assembly to the center conductor of the cable; and
   a second inductance device connected to the third connection, the second inductance device having an inductance approximately equal to a difference between an inductance of the cable when current is carried only on the outer conductors during transmission of three phase power over the cable and an inductance of the cable when current is carried only on the center conductor and one conductor during transmission of three phase power over the cable.

4. The three phase flat cable inductance assembly of claim 1, wherein the inductance balancer offsets variances in the inductance of the cable during three phase power transmission over the cable resulting from the physical position of the outer and center conductors to provide a total system inductance varying during three phase power transmission over the cable like a round three phase power cable.

5. The three phase flat cable inductance assembly of claim 1, wherein the inductance device further comprises:
   a dual wound inductor having first and second windings around a common core in a same direction, the first winding connected to one outer conductor of the cable at one end and the second winding connected to the other outer conductor of the cable at an opposite end, wherein current form the one outer conductor passes through the first winding in one direction while current from the other outer conductor passes through the second winding in an opposite direction.

6. The three phase flat cable inductance assembly of claim 5, wherein an inductance for the first winding is offset by an inductance for the second winding when current passes through both windings.

7. An electrical system, comprising:
   an electrical assembly including at least one inductance device comprising a dual wound inductor having connections for electrically coupling the inductor to outer conductors in the three phase power cable so that each winding carries current from one outer conductor, wherein the windings carry current from respective conductors in opposite directions through the inductor,
   wherein the at least one inductance device is configured to reduce a variation, between electrical power phases, of a total system inductance for the at least one inductance device and a flat three phase power cable during transmission of three phase power through the at least one inductance device and over the three phase power cable, and
   wherein the electrical assembly causes an inductance cycle of the total system inductance to be consistent during each electrical power phase and independent of which conductors within the three phase power cable carry current during the respective electrical power phase.

8. The electrical system according to claim 7, wherein the at least one inductance device further comprises:

a second inductor electrically coupled to a center conductor of the three phase power cable, wherein the second inductor equalizes an inductance cycle of the total system inductance during electrical power phases in which current is carried on the center conductor to the inductance cycle of the total system inductance during electrical power phases in which current is carried only on the outer conductors.

9. The electrical system according to claim 8, wherein the dual wound inductor and the second inductor are sized to produce equal inductance peaks during each electrical power phase.

10. The electrical system according to claim 7, wherein the at least one inductance device is connected within the electrical system to produce a minimum total inductance for the at least one inductance device when current is carried only on outer conductors of the cable during transmission of three phase power over the cable and a maximum total inductance for the at least one inductance device when current is carried only on a center conductor and one outer conductor of the cable during transmission of three phase power over the cable.

11. The electrical system according to claim 7, wherein the electrical assembly further comprises the flat three phase power cable and wherein the electrical system further comprises:

a power source coupled through the at least one inductance device to one end of the three phase power cable; and a load device coupled to an opposite end of the three phase power cable, wherein the power source is capable of selective transmitting three phase power through the at least one inductance device and over the three phase cable to the load device.

12. A method of altering inductance for an electrical system, comprising:

employing an electrical assembly including at least one inductance device within the electrical system by electrically coupling a dual wound inductor to outer conductors in the three phase power cable so that each winding carries current from one outer conductor, wherein the windings carry current from respective conductors in opposite directions through the inductor, wherein the electrical assembly, upon connection to a flat three phase cable and transmission of three phase power over the cable and through the electrical assembly, reducing a variation in a total system inductance for the cable and the electrical assembly between a time when the power is carried primarily on outer conductors of the cable and times when the power is carried primarily on a center conductor and one outer conductor of the cable, thereby causing an inductance cycle of the total system inductance to be consistent for all electrical power phases and independent of which conductors within the three phase power cable carry current.

13. The method according to claim 12, wherein the step of employing an electrical assembly including at least one inductance device within the electrical system further comprises:

electrically coupling a second inductor to a center conductor of the three phase power cable, wherein the second inductor equalizes an inductance cycle of the total system inductance during electrical power phases in which current is carried on the center conductor to the inductance cycle of the total system inductance during electrical power phases in which current is carried only on the outer conductors.

14. The method according to claim 13, further comprising:

selecting the dual wound inductor and the second inductor to produce equal inductance peaks during each electrical power phase.

15. The method according to claim 12, further comprising:

connecting the at least one inductance device within the electrical system to produce a minimum total inductance for the at least one inductance device when current is carried only on outer conductors of the cable during transmission of three phase power over the cable and a maximum total inductance for the at least one inductance device when current is carried only on a center conductor and one outer conductor of the cable during transmission of three phase power over the cable.

16. The method according to claim 12, further comprising:

coupling a power source through the at least one inductance device to one end of the three phase power cable;

coupling a load device to an opposite end of the three phase power cable; and selectively transmitting three phase power from the power source through the at least one inductance device and over the three phase cable to the load device.

* * * * *